Oct. 27, 1931.  F. H. OLTHOFF  1,828,815
LUG FASTENING MEANS
Filed Dec. 17, 1930  2 Sheets-Sheet 1
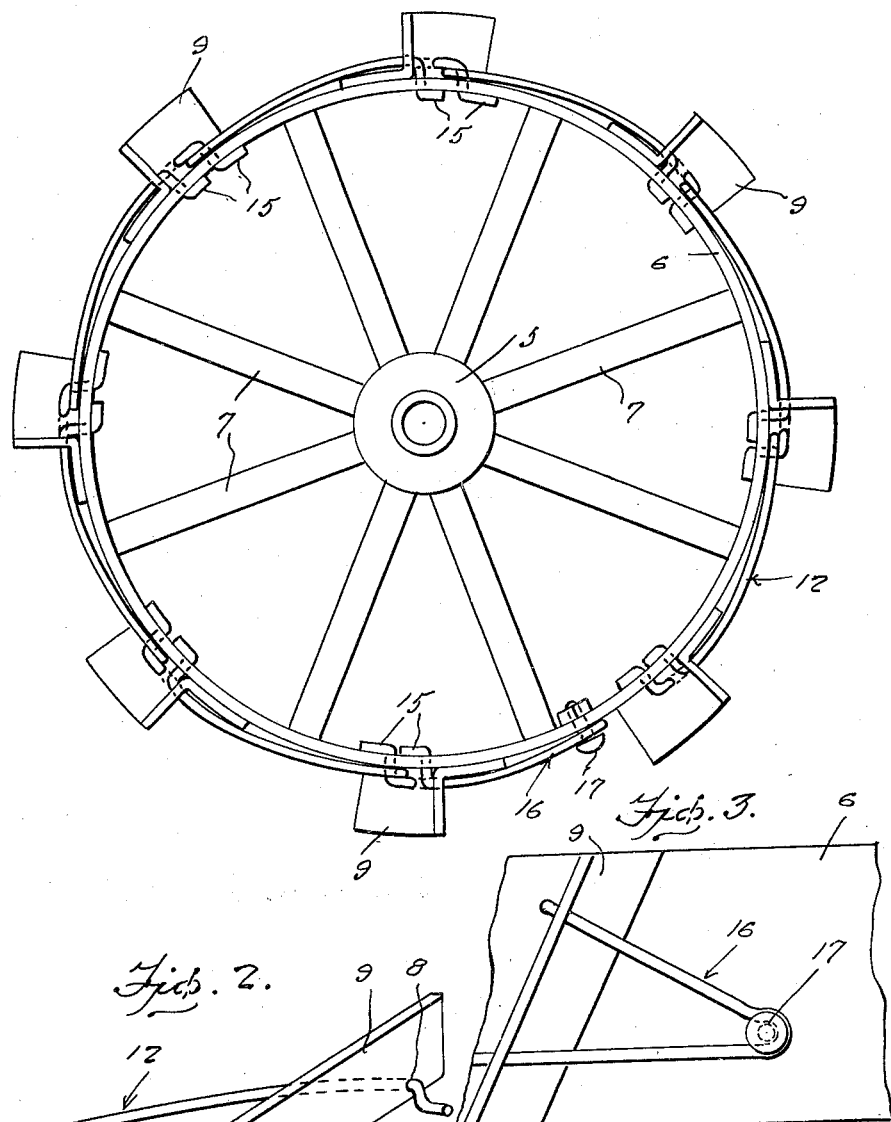
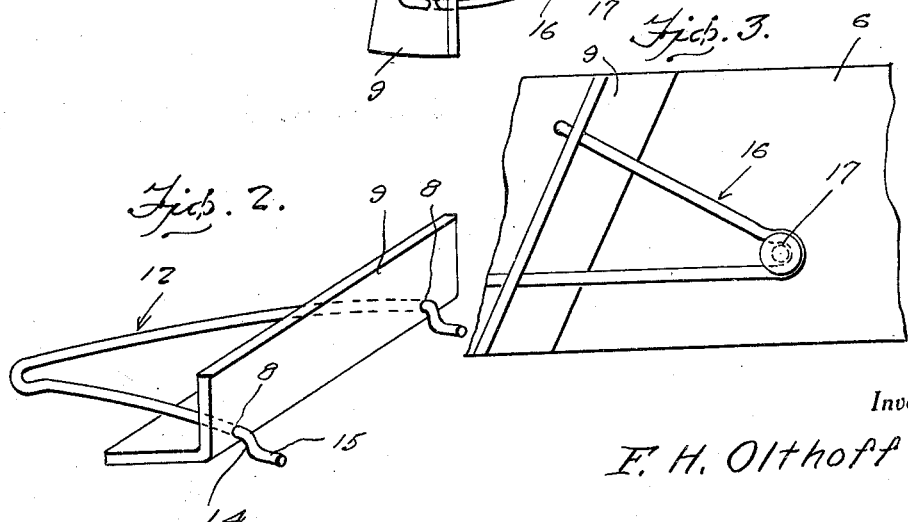
Inventor
F. H. Olthoff
By Clarence A. O'Brien
Attorney

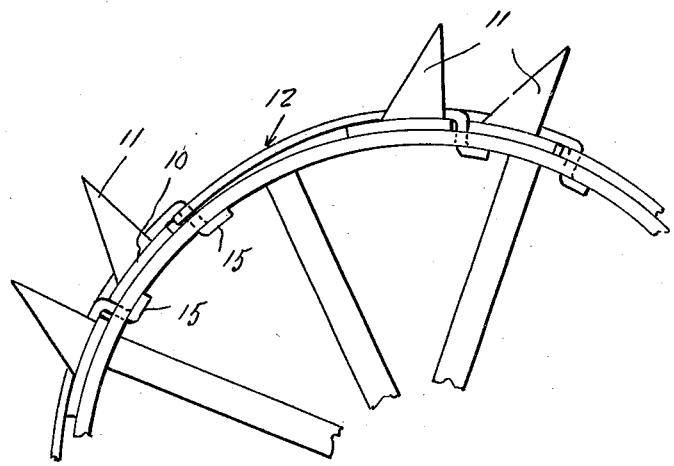
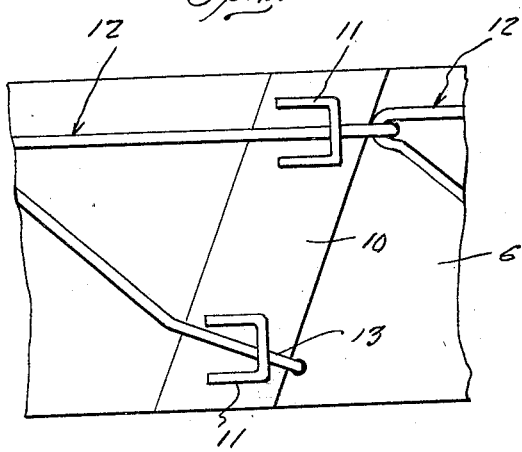
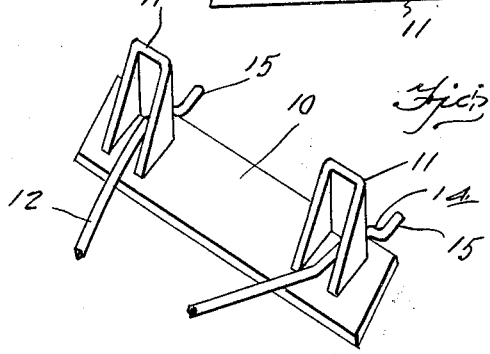

Patented Oct. 27, 1931

1,828,815

UNITED STATES PATENT OFFICE

FRANK H. OLTHOFF, OF PEARL CITY, ILLINOIS

LUG FASTENING MEANS

Application filed December 17, 1930. Serial No. 503,077.

This invention appertains to new and useful improvements in tractor wheels and more particularly to novel means for securing lugs to the wheel proper.

The principal object of the invention is to provide a tractor wheel equipped with removable traction lugs.

Other important objects and advantages of the invention will become apparent in the following specification.

In the drawings:—

Figure 1 represents a side elevational view of the improved wheel.

Fig. 2 represents a perspective view of one of the lugs and the securing element associated therewith.

Fig. 3 represents a fragmentary plan view of the wheel rim with the primary retaining link retaining its corresponding lug.

Fig. 4 represents a fragmentary side elevational view showing the use of modified lugs.

Fig. 5 is a plan view of a fragment of the wheel rim showing the modified lugs secured thereto.

Fig. 6 represents a fragmentary perspective view showing the modified lug structure.

Referring to the drawings wherein like numerals designate like parts, it can be seen that numeral 5 represents the usual traction wheel hub, while numeral 6 represents the tread annulus connected to the hub 5 by the spokes 7.

In the form of the invention shown in Figs. 1, 2 and 3, the traction lugs consist of angle bar sections, each provided with a pair of openings 8—8, in its upstanding flange portion, the lug proper being denoted generally by numeral 9.

It can be seen in Figs. 4, 5 and 6 that the lug construction is modified in that a plate 10 is provided for each lug structure and upstanding from each end portion of this plate 10 is an outwardly tapering lug 11 constructed of U iron. Each of these lugs 11 is provided with an opening for receiving the corresponding leg portion of the associated retaining link generally referred to by numeral 12.

As is clearly shown in Fig. 2, this retaining link 12 consists of a V-shaped member of stiff wire or like material, one leg portion of which is disposed obliquely inwardly as at 13. Each end of the link 12 is provided with an inwardly bent portion 14 and an offset extension.

The primary link generally referred to by numeral 16 is constructed substantially like the link 12, excepting that the apex portion thereof, may if desired be looped so as to accommodate the stud or bolt 17 on the wheel annulus 6. Thus the stud or bolt 17 serves as an anchor for the initial or primary link 16.

Preparatory to the insertion of the straight leg of each link 12 or the like 16 thru the corresponding opening in the wheel 6, the apex portion of the succeeding link is engaged with the preceding link so that the succeeding link passes through the apex portion, and thus a linked connection between the links is established to insure retention of the lugs against the wheel annulus. The same arrangement of the links is followed in the modified form shown in Fig. 6.

Obviously, these lugs may be removed from the wheel annulus at any time desired, for the purpose of repair or replacement.

While the foregoing specification sets forth the specification in specific terms, it is to be understood that numerous changes in the shape, size and materials may be resorted to without departing from the spirit and scope of the invention as claimed hereinafter.

Having thus described my invention, what I claim as new is:—

In combination with a wheel having a plurality of pairs of holes in its rim, a plurality of lugs having holes therein, a plurality of links each of V-shape with the limbs passing through the holes in the lugs and the extremities of the limbs being of substantially right angled shape to pass through the holes in the rim to engage the inner circumference of the rim, means for detachably connecting the bight of one link with the rim, and the bight portions of the other links each receiving a bent extremity of one limb of the preceding link.

In testimony whereof I affix my signature.

FRANK H. OLTHOFF.